(12) United States Patent
Brener-Shalem et al.

(10) Patent No.: US 12,386,678 B2
(45) Date of Patent: Aug. 12, 2025

(54) INTELLIGENT LOAD SCHEDULING IN A STORAGE SYSTEM

(71) Applicant: Dell Products L.P., Round Rock, TX (US)

(72) Inventors: Irit Brener-Shalem, Ramat Gan (IL); Michal Yarimi, Rehovot (IL); Yonatan Yeshanov, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 629 days.

(21) Appl. No.: 17/726,853

(22) Filed: Apr. 22, 2022

(65) Prior Publication Data
US 2023/0342221 A1    Oct. 26, 2023

(51) Int. Cl.
G06F 9/50 (2006.01)
G06N 20/00 (2019.01)

(52) U.S. Cl.
CPC ........... *G06F 9/5083* (2013.01); *G06N 20/00* (2019.01)

(58) Field of Classification Search
CPC .................................................. G06F 9/5083
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 9,372,751 B2 | 6/2016 | McNutt | |
| 9,514,014 B2 | 12/2016 | Webman et al. | |
| 9,892,045 B1 | 2/2018 | Douglis et al. | |
| 10,078,598 B1 | 9/2018 | Wallace et al. | |
| 10,331,561 B1 | 6/2019 | Shilane et al. | |

(Continued)

FOREIGN PATENT DOCUMENTS

| | | |
|---|---|---|
| WO | 2015108670 A1 | 10/2020 |
| WO | 2020204880 A1 | 10/2020 |
| WO | 2020204882 A1 | 10/2020 |

OTHER PUBLICATIONS

Bodas, Deva, et al. "Simple power-aware scheduler to limit power consumption by hpc system within a budget." 2014 Energy Efficient Supercomputing Workshop. IEEE, 2014. (Year: 2014).*

(Continued)

*Primary Examiner* — Charlie Sun
(74) *Attorney, Agent, or Firm* — Ryan, Mason & Lewis, LLP

(57) ABSTRACT

Techniques are provided for implementing intelligent load scheduling in a storage system. In an illustrative embodiment, a method comprises collecting a plurality of metrics corresponding to one or more workloads, and processing the plurality of metrics using a machine learning model to predict a load on at least one server. The machine learning model predicts the load on the at least one server based, at least in part, on weights for respective ones of the plurality of metrics generated during training of the machine learning model. In the method, execution by the at least one server of one or more processes in addition to the one or more workloads is scheduled based, at least in part, on the load predicted by the machine learning model.

20 Claims, 8 Drawing Sheets

(56) References Cited

U.S. PATENT DOCUMENTS

| | | | |
|---|---|---|---|
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 11,221,975 | B2 | 1/2022 | Puder et al. |
| 11,262,933 | B2 | 3/2022 | Matosevich et al. |
| 11,301,162 | B2 | 4/2022 | Matosevich et al. |
| 11,307,935 | B2 | 4/2022 | Keller et al. |
| 11,740,933 | B2 * | 8/2023 | Vega ............... G06F 16/9024 718/102 |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2011/0276538 | A1 * | 11/2011 | Knapp ............... G06F 16/1827 709/219 |
| 2013/0305002 | A1 | 11/2013 | Hallak et al. |
| 2014/0053151 | A1 * | 2/2014 | Heninger ............ G06F 9/5077 718/1 |
| 2014/0165071 | A1 * | 6/2014 | Celis ................. G06F 9/5066 718/104 |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2022/0004320 | A1 | 1/2022 | Matosevich et al. |
| 2022/0035788 | A1 | 2/2022 | Aharoni et al. |
| 2022/0113867 | A1 | 4/2022 | Aharoni et al. |
| 2022/0114184 | A1 | 4/2022 | Sharma et al. |
| 2022/0116454 | A1 | 4/2022 | Aharoni et al. |
| 2022/0121458 | A1 | 4/2022 | Moran et al. |
| 2023/0089593 | A1 * | 3/2023 | O'Reilly ............ G06F 1/3228 718/104 |
| 2023/0281472 | A1 * | 9/2023 | Asghari ............ G06N 20/20 706/12 |

OTHER PUBLICATIONS

International Search Report and Written Opinion of PCT/US2019/024885 dated Jan. 7, 2020, 13 pages.
International Search Report and Written Opinion of PCT/US2019/024900 dated Jan. 7, 2020, 12 pages.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006.1598129, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Dell EMC, "Getting To Know Dell EMC PowerFlex," Version 3.5.x, Rev. 02, Jan. 2021, 66 pages.
Dell EMC, "Dell EMC VxRack FLEX," Dell EMC Product Overview, 2018, 5 pages.
G. Soundararajan et al., "Dynamic Resource Allocation for Database Servers Running on Virtual Storage," FAST 2009: Proceedings of the 7th conference on File and storage technologies, Feb. 2009, pp. 71-84.
T. McAleer, "Interpreting Linear Regression Through statsmodels .summary()" https://medium.com/swlh/interpreting-linear-regression-through-statsmodels-summary-4796d359035a, Dec. 5, 2020, 7 pages.
U.S. Appl. No. 17/077,105 filed in the name of Yosef Shatsky et al. Oct. 22, 2020, and entitled "Volume Tiering in Storage Systems."
U.S. Appl. No. 17/106,988 filed in the name of Rivka Matosevich et al. Nov. 30, 2020, and entitled "Managing Host Connectivity to a Data Storage System."
U.S. Appl. No. 17/123,525 filed in the name of Itay Keller et al. Dec. 16, 2020, and entitled "Deferred Reclamation of Invalidated Entries Associated with Replication in a Log-Structured Array."
U.S. Appl. No. 17/145,646 filed in the name of Yosef Shatsky et al. Jan. 11, 2021, and entitled "Redistribution of Processing Groups between Server Nodes Based on Hardware Resource Utilization."
U.S. Appl. No. 17/232,203 filed in the name of Roman Spiegelman Apr. 16, 2021, and entitled "Object Synchronization of Server Nodes in a Network Computing Environment."
U.S. Appl. No. 17/236,256 filed in the name of Doron Tal et al. Apr. 21, 2021, and entitled "Recovery from Partial Device Error in Data Storage System."
U.S. Appl. No. 17/306,601 filed in the name of Rivka Matosevich et al. May 3, 2021, and entitled "Managing Replication Journal in a Distributed Replication System."
U.S. Appl. No. 17/308,166 filed in the name of Adi Bar Shalom et al. May 5, 2021, and entitled "Journal Barrier Consistency Determination."
U.S. Appl. No. 17/351,733 filed in the name of Yosef Shatsky et al. Jun. 18, 2021, and entitled "Data Deduplication in a Disaggregated Storage System."
U.S. Appl. No. 17/361,666 filed in the name of Yosef Shatsky et al. Jun. 29, 2021, and entitled "Tracking Utilization of Data Blocks in a Storage System."
U.S. Appl. No. 17/511,695 filed in the name of Yosef Shatsky et al. Oct. 27, 2021, and entitled "Write Cache Management."
U.S. Appl. No. 17/511,699 filed in the name of Yosef Shatsky et al. Oct. 27, 2021, and entitled "Metadata Management in Storage Systems."
U.S. Appl. No. 17/512,890 filed in the name of Yosef Shatsky et al. Oct. 28, 2021, and entitled "Utilizing Checkpoints for Resiliency of Metadata in Storage Systems."
U.S. Appl. No. 17/569,198 filed in the name of Yosef Shatsky Jan. 5, 2022, and entitled "Utilizing a Persistent Write Cache as a Redo Log."
U.S. Appl. No. 17/583,365 filed in the name of Doron Tal et al. Jan. 25, 2022, and entitled "Data Deduplication in a Storage System."

(56) References Cited

OTHER PUBLICATIONS

U.S. Appl. No. 17/583,787 filed in the name of Michal Yarimi et al. Jan. 25, 2022, and entitled "Intelligent Defragmentation in a Storage System."

* cited by examiner

```
Explained variation per principal component:
    [0.68254416 0.11195616]
Data cover of:
    79%
Principal components:
    [[-0.37213316 -0.16299409 -0.2696778  -0.39192009 -0.4006587  -
0.40854625 -0.37409029 -0.37582095]
     [ 0.12215966  0.89660047 -0.37752385 -0.13550026 -0.12713605 -
0.03367679  0.02695133  0.04770701]]
==========================================================================
=============
 OLS Regression Results
==========================================================================
=============
Dep. Variable: iops_primary_writes_mbps  R-squared: 0.866
Model: OLS                                Adj. R-squared: 0.866
Method: Least Squares                     F-statistic: 5160.
Date: Sun, 04 Jul 2021                    Prob (F-statistic): 0.00
Time: 13:11:44                            Log-Likelihood: -662.43
No. Observations: 1600                    AIC: 1331.
Df Residuals: 1597                        BIC: 1347.
Df Model: 2
Covariance Type: nonrobust
==========================================================================
=======
         coef        std err      t           P>|t|     [0.025 0.975]
--------------------------------------------------------------------------
-------
const    4.185e-16   0.009        4.57e-14    1.000     -0.018 0.018
x1       -0.3998     0.004        -99.106     0.000     -0.408 -0.392
x2       -0.2022     0.009        -22.315     0.000     -0.220 -0.184
==========================================================================
=======
Omnibus: 558.255                          Durbin-Watson: 1.307
Prob(Omnibus): 0.000                      Jarque-Bera (JB): 8926.442
Skew: 1.191                               Prob(JB): 0.00
Kurtosis: 14.323                          Cond. No. 2.27
==========================================================================
=======
```

FIG. 4

INTELLIGENT LOAD SCHEDULING IN A STORAGE SYSTEM

FIELD

The field relates generally to information processing systems, and more particularly to storage in information processing systems.

BACKGROUND

A wide variety of different types of distributed storage systems are known. Such storage systems include clustered storage systems as well as other types of storage systems that are distributed across multiple storage nodes. Distributed storage systems can include a potentially large number of distributed storage nodes that are interconnected by a mesh network or other type of communication network. Each such storage node of a distributed storage system typically processes input-output (IO) operations from one or more host devices and in processing those TO operations runs various storage application processes that generally involve interaction of that storage node with one or more other ones of the storage nodes.

In distributed storage systems, workloads (e.g., TO operations) from host devices may be distributed among multiple servers (e.g., storage nodes) to provide, for example, load balancing, high availability, utilization of resources available from different servers and/or fault tolerance. To ensure adequate performance levels, the percentage of a workload performed by a given server should be proportional to the server's processing resources and capabilities.

SUMMARY

Exemplary embodiments of the disclosure include techniques for implementing intelligent load scheduling in a storage system. For example, an exemplary embodiment includes a method which comprises collecting a plurality of metrics corresponding to one or more workloads, and processing the plurality of metrics using a machine learning model to predict a load on at least one server. The machine learning model predicts the load on the at least one server based, at least in part, on weights for respective ones of the plurality of metrics generated during training of the machine learning model. In the method, execution by the at least one server of one or more processes in addition to the one or more workloads is scheduled based, at least in part, on the load predicted by the machine learning model.

Other embodiments of the disclosure include, without limitation, systems and articles of manufacture comprising processor-readable storage media, which are configured to implement intelligent load scheduling in a storage system.

BRIEF DESCRIPTION OF THE DRAWINGS

FIG. 4 depicts a table of an output of multiple linear regression on metrics processed using PCA in an illustrative embodiment.

DETAILED DESCRIPTION

Exemplary embodiments of the disclosure will now be discussed in further detail with regard to systems and methods for implementing intelligent load scheduling in a storage system. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
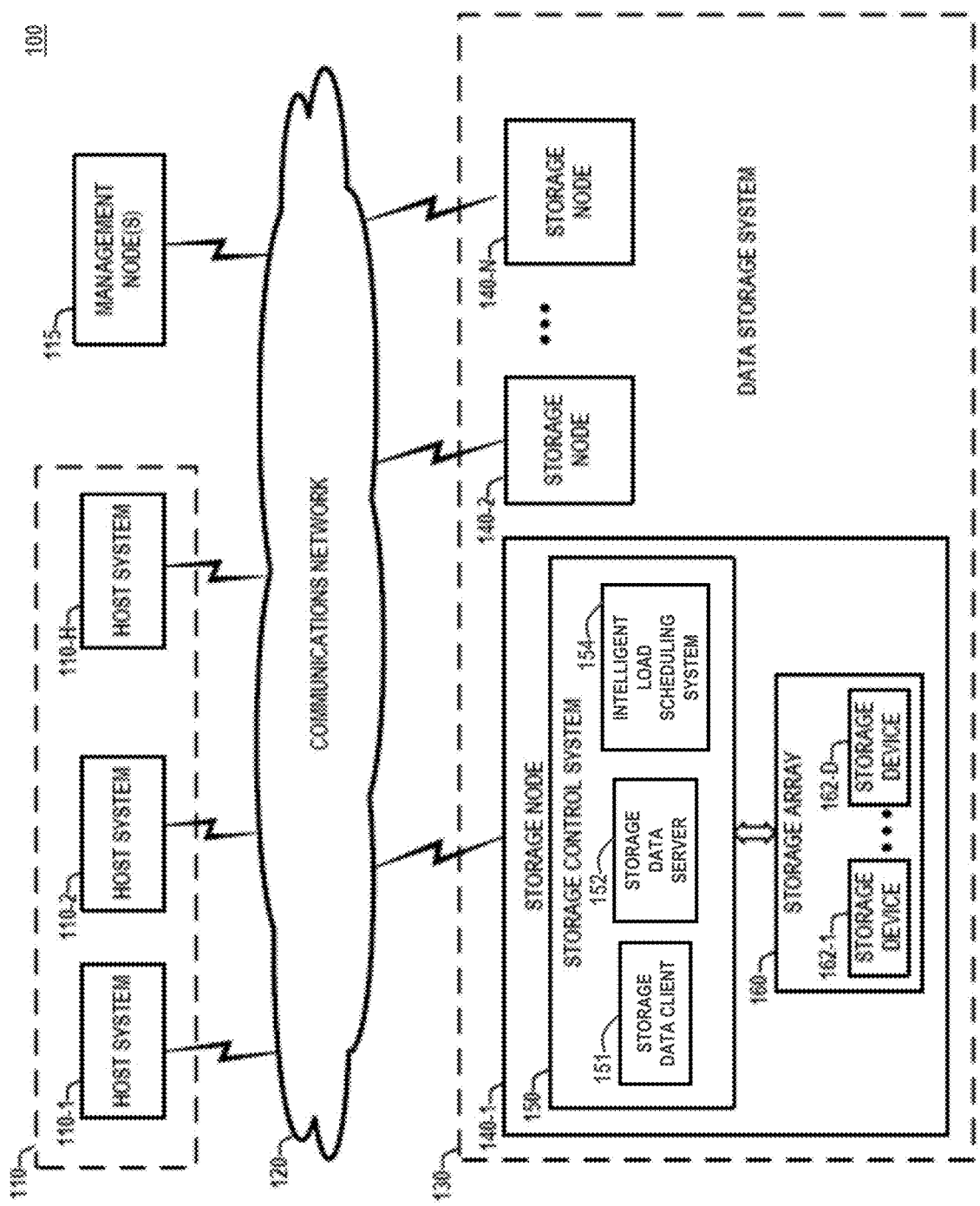
FIG. 1 schematically illustrates a network computing system comprising a storage system incorporating functionality for intelligent load scheduling in an illustrative embodiment.

FIG. 1 schematically illustrates a network computing system comprising a storage system which implements an intelligent load scheduling system, according to an exemplary embodiment of the disclosure. The network computing system 100 comprises one or more host systems 110-1, 110-2, . . . 110-H (collectively, host systems 110), one or more management nodes 115, a communications network 120, and a data storage system 130. The data storage system 130 comprises one or more storage nodes 140-1, 140-2, . . . , 140-N (collectively, storage nodes 140), and may comprise a distributed storage system. As shown in FIG. 1, the storage node 140-1 comprises a storage control system 150, and a storage array 160 comprising a plurality of storage devices 162-1, . . . , 162-D (collectively, storage devices 162). The storage control system 150 comprises a storage data client 151, storage data server 152, and an intelligent load scheduling system 154, the functions of which will be described in further detail below. In some embodiments, the other storage nodes 140-2 . . . 140-N have the same or similar configuration as the storage node 140-1 shown in FIG. 1.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise standalone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. In some embodiments, the host systems 110 include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in storage arrays 160 of the storage nodes 140. Such data access requests are referred to herein as "input-output (10) operations" that are processed by a corresponding one of the storage nodes 140. The term "input-output" as used herein refers to at least one of input and output. For example, IO operations may comprise write requests and/or read requests directed to logical addresses of a particular logical storage volume of a given one of the storage nodes 140. These and other types of IO operations are also generally referred to herein as IO requests.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement input/output (I/O) channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 800, shown in FIG. 8) which comprise processors and system memory, and host virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprise storage nodes, which are separate from the storage control nodes. In such a configuration, the storage control systems 150 are configured to handle the processing of data associated with data access requests (i.e., IO read and write requests), and the storage arrays 160 are configured to handle writing/reading data to/from respective storage devices 162. In a disaggregated architecture, each storage control system 150 would be configured to directly access data stored in each storage array 160 in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of each storage node 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage control systems 150 and the storage arrays 160 are interconnected in a full-mesh network, wherein back-end interconnectivity is achieved using, e.g., a redundant high-speed storage fabric, wherein the storage control systems 150 can utilize remote procedure calls (RPC) for control messages and remote direct memory access (RDMA) for accessing data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts IO requests, and utilizes the intercepted IO request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs. Alternatively, or in addition to the SDCs on the host systems 110, as shown in FIG. 1, each of the storage nodes 140 comprises a storage data client (SDC) 151, which performs the same or substantially the same functions as the SDCs on the host systems 110.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs on the host systems 110 and/or SDCs 151, and to the storage data servers 152 to allow such components to control data path operations. The MDM modules are configured to manage the mapping of the SDCs on the host systems 110 and/or SDCs 151 to the storage data servers 152 of the storage nodes 140. The MDM modules manage various types of metadata that are required to perform various management operations in the storage environment such as, e.g., managing configuration changes, managing the SDCs on the host systems 110 and/or SDCs 151 and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

Workloads from host systems 110 (e.g., IO operations) are not the only workloads the storage nodes 140 are executing. The storage control system 150, more particularly, the intelligent load scheduling system 154, performs a workload balancing process that accounts for total storage node workload comprising foreground processes (i.e., IO operations) and background processes (e.g., data checksum validation, defragmentation, scrubbing, data compression/decompression, data deduplication, thin provisioning, data protection functions, etc.). Other workload service level vectors, such as, for example, reliability requirements, up-time, performance, etc. may also be addressed by background processes. Workload balancing may be performed on an individual storage node 140 or between multiple storage nodes 140 such as in a distributed storage environment.

Processing resources vary between storage nodes 140. For example, storage nodes 140 with weaker CPU cores than other storage nodes 140 will experience some workloads as heavier loads than the other storage nodes 140 with stronger CPU cores. In other examples, storage nodes 140 having graphics processing units (GPUs) and/or more memory may be able to better process certain workloads than storage nodes 140 without GPUs and/or with less memory.

To account for the variable hardware and other resource capabilities between storage nodes 140, the embodiments advantageously provide techniques for controlling loads on a storage node 140. In particular, the embodiments provide an intelligent load scheduling system 154 which is configured to balance the loads from foreground processes (e.g., IO operations) and background processes (e.g., scrubbing, defragmentation, etc.) in order not to impact the foreground processes. Foreground processes are typically created by user (e.g., customer or client) applications and may have higher priority than background processes. Illustrative embodiments are advantageously configured to perform real-time analysis of storage node loads, and schedule background processes to execute later than foreground processes when necessary. The intelligent load scheduling system 154 uses machine learning techniques to determine when deferral of background processes is needed, and when to reschedule the background processes. In more detail, the embodiments utilize Principal Component Analysis (PCA) techniques to generate a function which enables storage nodes 140 to implement load scheduling in real-time responsive to incoming workloads from host systems 110. Exemplary systems and methods for performing intelligent load scheduling according to embodiments of the disclosure will now be discussed in further detail in conjunction with FIGS. 2-7.

It is to be understood that although the embodiments are discussed in terms of storage nodes 140, the embodiments are not necessarily limited thereto, and are applicable to other types of servers where load scheduling as described herein may need to be implemented.

Figure 2:
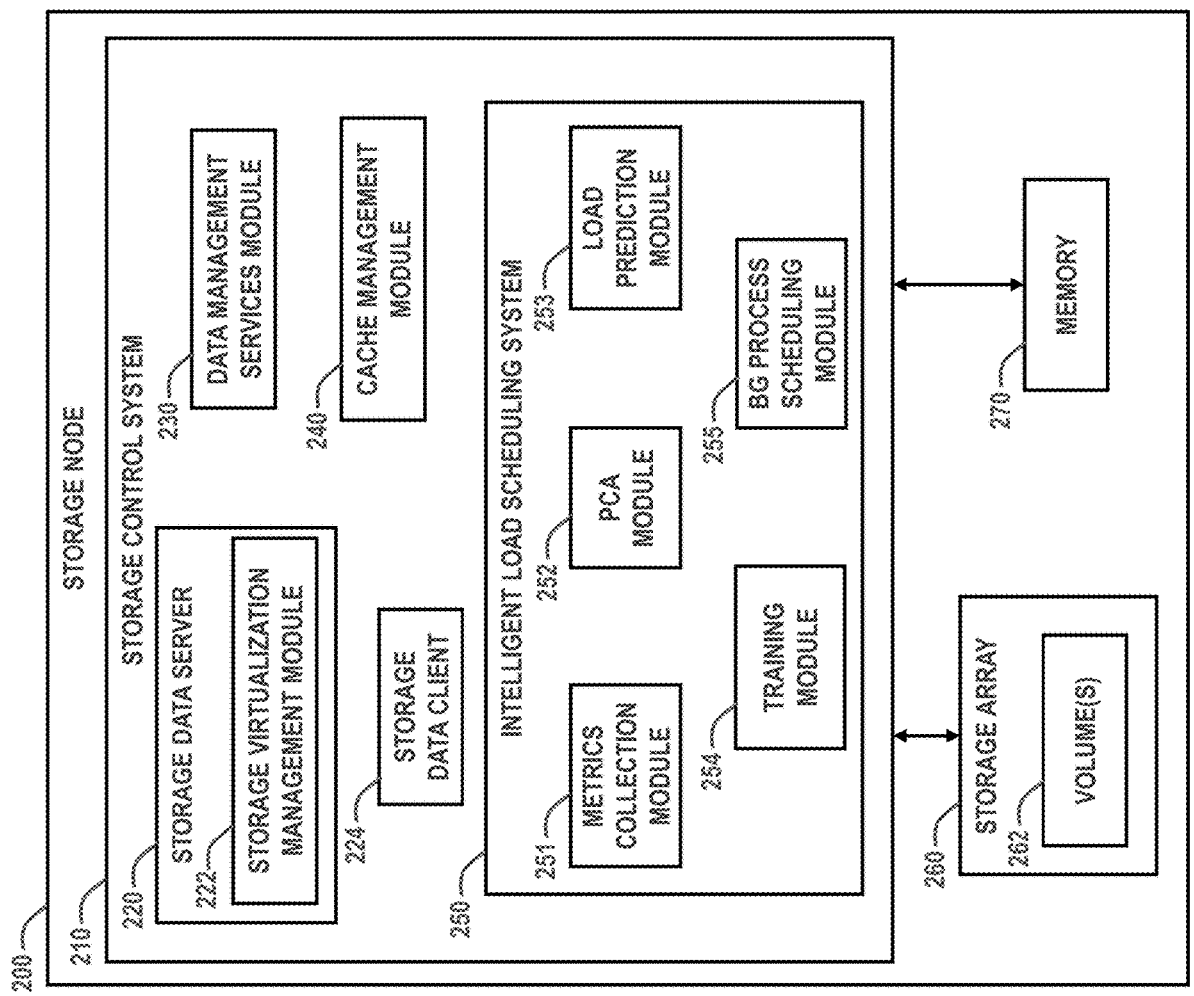
FIG. 2 schematically illustrates a storage node which implements an intelligent load scheduling system in an illustrative embodiment.

FIG. 2 schematically illustrates a storage node which implements an intelligent load scheduling system, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a storage data client 224, a data management services module 230, a cache management module 240, and an intelligent load scheduling system 250. The storage data server 220 comprises a storage virtualization management module 222. The intelligent load scheduling system 250 comprises various modules including, but not limited to, a metrics collection module 251, a PCA module 252, a load prediction module 253, a training module 254, and a background (BG) process scheduling module 255, the functions of which will be described in further detail below.

The storage node 200 further comprises a storage array 260 and memory 270. The storage array 260 comprises a plurality of storage devices, wherein each storage device comprises physical storage addresses that can be mapped to logical addresses of one or more volumes 262 (or portions of volumes) that are configured within the storage array 260. In some embodiments, the volume(s) 262 have logical addresses that are partitioned into extents, and each storage device comprises physical addresses that are mappable to logical addresses such that each storage device comprises extents corresponding to a portion of the logical address space. In some embodiments, the memory 270 comprises volatile random-access memory (RAM) such as dynamic RAM (DRAM), synchronous DRAM (SDRAM), etc. The memory 270 is configured to store, for example, configuration files that are utilized to support intelligent load scheduling operations as discussed herein.

The storage data server 220 implements functions as discussed above in connection with the storage data server 152, such as processing IO write and read requests received from host systems to write/read data to/from the storage array 260. The storage virtualization management module 222 implements any suitable logical volume management system which is configured to create and manage the volume(s) 262 by aggregating the capacity of the storage array 260 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The storage data client 224 implements functions as discussed above in connection with the SDCs 151 such as, for example, exposing shared block volumes to a given host system. The cache management module 240 provisions and manages one or more in-RAM caches (e.g., read cache) in the memory 270.

The data management services module 230 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage array 260) and presents logical (virtualized) addresses to users in the form of LUNs, the storage data server 220 generates and manages metadata to provide mapping between logical addresses and physical addresses (e.g., a logical-to-physical mapping directory) which is stored on disk, wherein at any given time, a plurality of logical-to-physical pages of the logical-to-physical mapping directory are swapped into the memory 270 and stored in a read cache during runtime (e.g., the cached logical-to-physical pages). In addition, the storage control system 210 generates and manages metadata which is utilized for managing snapshots, managing remote replication, managing deduplication, managing data compression, and maintaining resiliency related metadata (e.g., RAID), etc.

The various modules of the intelligent load scheduling system 250 implement functions to enable the storage control system 210 to perform load scheduling operations on the storage nodes 200 (or 140). The metrics collection module 251 for each storage node 200 collects a set of measured metrics that correlate to one or more workloads (e.g., IO operations) received from one or more host devices of a host system. The metrics comprise, for example, a write size rate, a read size rate and a latency rate for a storage node 200. In some cases, the metrics are codependent. As a result, simple arithmetic techniques (e.g., mean) are not used to infer a current workload of a storage node 200. Depending on whether the intelligent load scheduling system 250 is in a training phase, or a test phase, the collected metrics may be, for example, training or test metrics.

The PCA module 252, in conjunction with the training module 254, processes a plurality of training metrics to reduce one or more dimensions of and remove dependencies from the metrics. During training, the metrics collection module 251 collects the training metrics for one or more workloads and identifies a current load level (e.g., percent (100%, 75%, 50%, etc.) loaded) on a storage node 200 or plurality of storage nodes 200 that is associated with the training metrics. Using PCA techniques, the PCA and training modules 252 and 254 process the training metrics and the current load level to allow PCA to produce respective weights for the supplied training metrics. In a non-limiting illustrative example, a metric X has a weight of 70% (e.g., 70% of the metric X contributes to the load), while a metric Y weight has a weight of 5% (e.g., 5% of metric Y contributes to the load). The PCA module 252 arranges the weights in a formula (weight*test metric value), which is used by the load prediction module 253 to predict an overall load on one or more storage nodes 200 when test metrics are collected. The load prediction module 253 is configured to compute load on a per storage node or system-wide basis.

Using the weights for respective ones of the plurality of training metrics generated during training, the load prediction module 253 processes a plurality of test metrics to predict a per storage node or system-wide load corresponding to the test metrics. Based on the predicted load, the BG process scheduling module 255 automatically determines the allowed background processes to be executed, and the background processes to be postponed to a later time. The intelligent load scheduling system collects test metrics, predicts a load and schedules background processes in real-time (e.g., within microseconds or milliseconds).

The PCA module 252 accounts for all metrics associated with workloads from host systems (e.g., host systems 110) and provides an aggregated result that gives each metric its own weight in the decision when the next workload (e.g., background operation) should run. For example, there is a load correlation/dependency between a device's (e.g., storage node's) read rate and the sizes of its read commands. Another example for parameter dependency is defragmentation IOs, which are added to foreground IO operations. As a result, a total storage node load must account for defragmentation IOs by subtracting them from foreground IO operations. Without the techniques of the embodiments (e.g., PCA or other equivalent machine learning methodology) to reduce dependent variables, a load calculation algorithm may include a bias and, in some cases, require more resources to process the load calculation than to perform the workloads.

After the PCA module 252 processes the training metrics, the results of the multiple linear regression (e.g., a set of respective weights respectively corresponding to the metrics) are used by the load prediction module 253 to predict the per storage node or system-wide load when scheduling operations (e.g., background processes) based on test metrics corresponding to incoming workloads. For example, when considering starting a new background operation, the metrics collection module 251 will collect a set of test metrics and the load prediction module 253 uses the weights generated during training to compute a current load, which is used by the BG process scheduling module 255 to determine whether the new background operation may commence. For example, the BG process scheduling module 255 compares the predicted load to a designated load threshold. If the predicted load is below the designated load threshold, the background operation can start. If the predicted load is at or above the designated load threshold, then the background operation is deferred to a later time.

According to illustrative embodiments, the constants (e.g., weights) are generated through a statistical analysis on benchmark measurements used by the PCA and training modules 252 and 254 during training. As noted herein above, PCA techniques are used by the PCA module 252 to reduce dependencies so that the resulting adaptive function for real-time workloads analysis will have better accuracy and consume less processing resources. In other words, the weights produced by the PCA techniques, which are used with the test metrics by the load prediction module 253 to determine current load, produce an accurate per storage node or system-wide load using simpler computations than those that would be required without use of the PCA or other reduction techniques of the illustrative embodiments.

The PCA techniques used by the PCA module 252 reduce dimensionality and remove feature dependence. The principal components are used as vectors. If the vectors are orthogonal, they are independent, and thus sorted by importance to the overall storage node load.

For example, the amount of data described by PRINCIPAL_COMPONENT[i]>the amount of data described by PRINCIPAL_COMPONENT[i+1] where $0 \leq i < n$. In illustrative embodiments, the number of principal components for an output is configurable. For example, assuming there are 4 metrics and at least an 85% accuracy is required. If the amount of data described by the principal components is as follows: [70%, 13%, 11%, 6%] (where all the percentages add up to 100%), then 3 principal components are needed to add up to at least 85% (e.g., 70%, 13% and 11%; 70%, 13% and 6%; or 70%, 11% and 6%). In this case, the dimensionality is reduced from 4 to 3.

If dependent features are the measured metrics (e.g., device write/read size rate, etc.), the dimension is the number of measured metrics and the dimension to reduce to is the number of principal components. After running the training data through the PCA model, a new set of metrics that are in the PCA space is generated, which can be used in multiple regression to find a linear fit.

Figure 3:
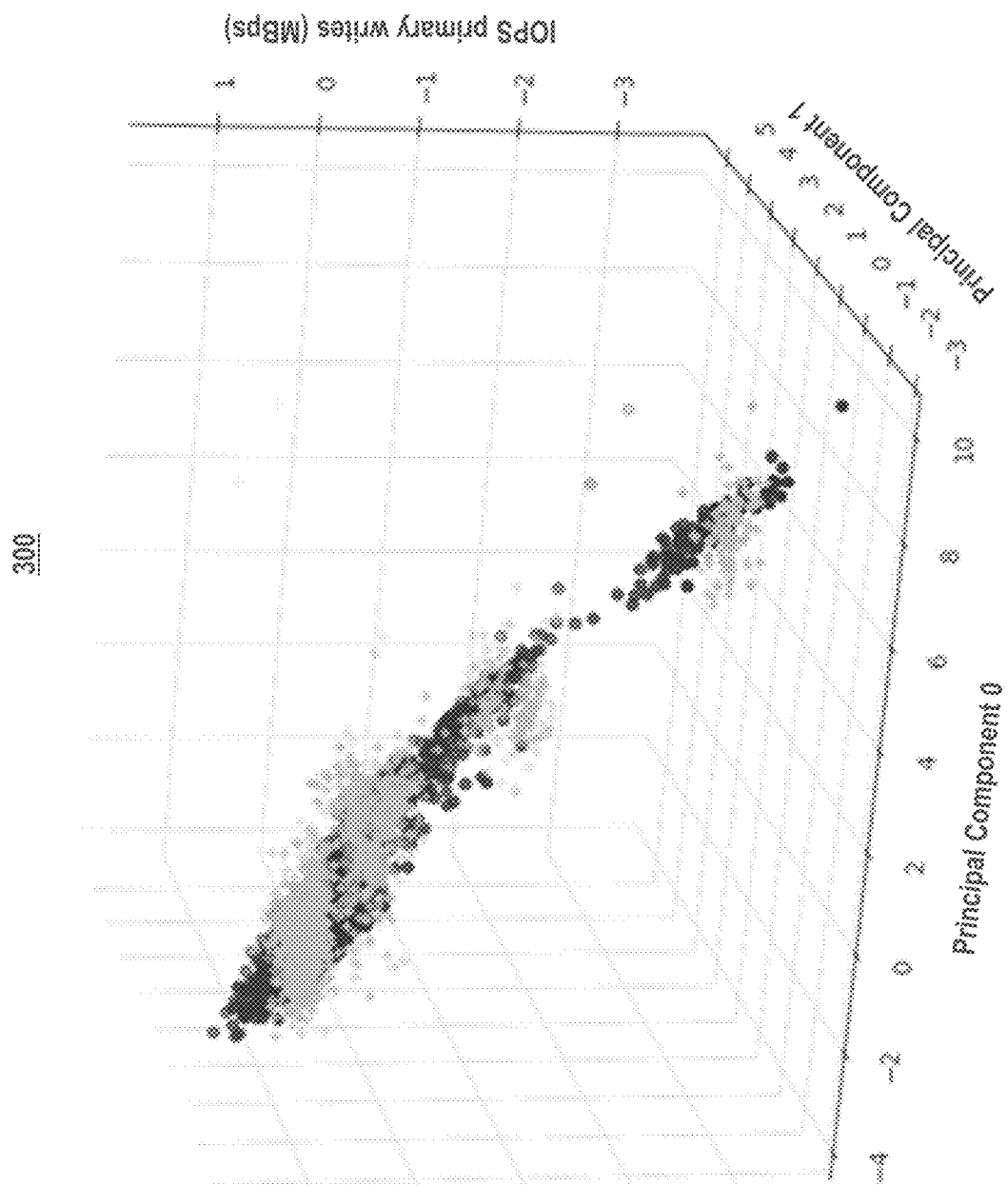
FIG. 3 depicts a plot of an output of multiple linear regression on metrics processed using principal component analysis (PCA) in an illustrative embodiment.

FIG. 3 depicts a plot 300 of an output of multiple linear regression on metrics processed using PCA, where two principal components were requested. The lighter (gray) portions correspond to the actual measurements of the variable being predicted (e.g., System/Device Load) and the darker (black) portions correspond to the predicted load provided by the load prediction module 253 given by multiple regression. The units for load in this example are 10 operations per second (IOPS) in megabytes per second (MBps). As can be seen in FIG. 3, the x-axis corresponds to Principal Component 0, the y-axis corresponds to Principal Component 1 and z-axis corresponds to IOPS primary writes (Standardized). All of the black points are in the 2-dimensional plane.

FIG. 4 depicts a table 400 of an output of multiple linear regression on metrics processed using PCA. Based on the data in the table 400, two principal components explain 79% of the data for which prediction is being attempted. A coefficient of determination (R-squared) is 0.866, which indicates a good fit. As can be understood, the coefficient of determination corresponds to the proportion of the variation in the dependent variable that is predictable from the independent variable(s), and varies between 0 and 1, where a number closer to 1 indicates a good fit. For example, in percentage terms, 0.866 means that the model explains 86.6% of the variation in the dependent variable. The principal components are a set of coefficients that define a linear combination of the measured metrics.

Figure 5:
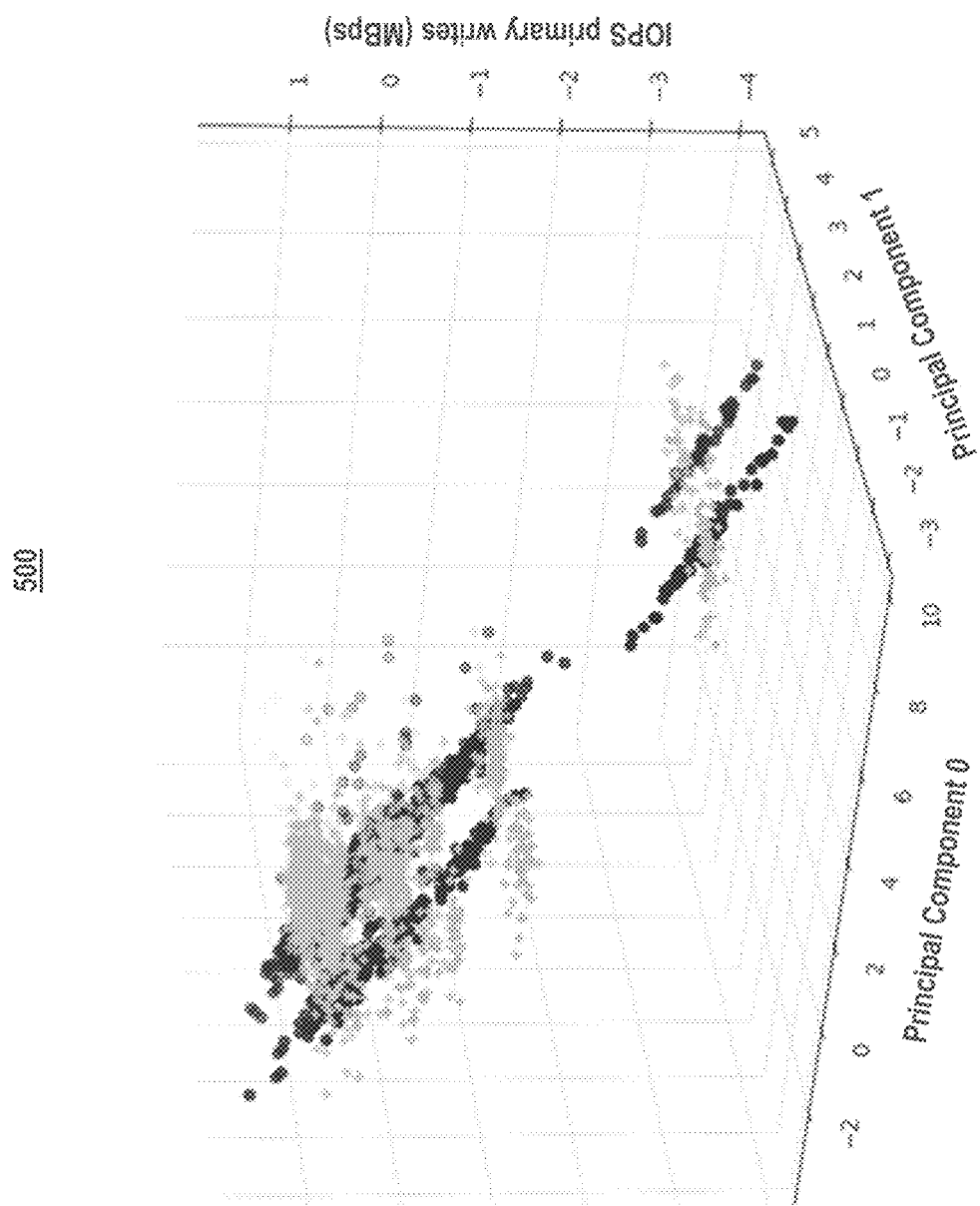
FIG. 5 depicts a plot of an output of multiple linear regression on metrics that are different from those used in connection with FIGS. 3 and 4 and processed using PCA in an illustrative embodiment.
Figure 6:
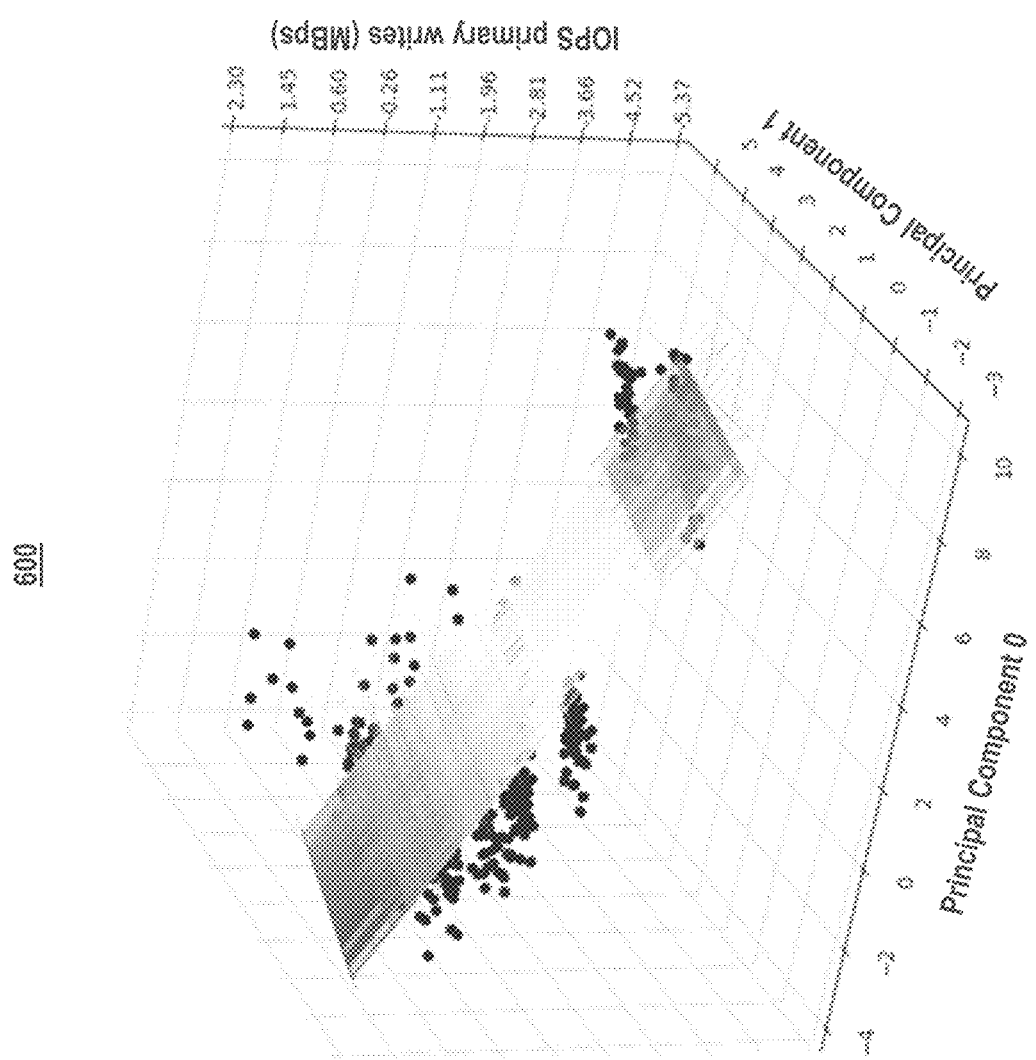
FIG. 6 depicts an alternative plot of the output of multiple linear regression on the metrics of FIG. 5 in an illustrative embodiment.

FIG. 5 depicts a plot 500 of an output of multiple linear regression on metrics that are different from those used in connection with FIGS. 3 and 4 and processed using PCA, where two principal components were requested. Similar to FIG. 3, the lighter (gray) portions correspond to the actual measurements of the variable being predicted (e.g., System/Device Load) and the darker (black) portions correspond to the predicted load provided by the load prediction module 253 given by multiple regression. Similar to FIG. 3, the x-axis corresponds to Principal Component 0, the y-axis corresponds to Principal Component 1 and z-axis corresponds to IOPS primary writes (Standardized). FIG. 6 depicts an alternative plot 600 of the output of multiple linear regression on the metrics of FIG. 5 in an illustrative embodiment. Similar to FIGS. 3 and 5, the x-axis corresponds to Principal Component 0, the y-axis corresponds to Principal Component 1 and z-axis corresponds to IOPS primary writes (Standardized).

According to illustrative embodiments, for each new measurement, the function is refining its coefficients, making it adaptive to the storage node 200 (or 140) it runs on. For example, in a training loop, over relatively long time intervals (e.g., longer than the interval for running the inference loop), collected training metrics and the corresponding per storage node or system-wide load are input to the PCA module 252. The PCA module 252 runs a multiple linear regression to update the linear inference function coefficients (e.g., metric weights), which are updated in a configuration file stored in the memory 270. In the inference loop, over relatively short intervals (e.g., 2-3 milliseconds) the metrics collection module 251 collects a plurality of test metrics corresponding to one or more workloads. The metrics are applied to the linear inference function by the load prediction module 253 to predict per storage node or system-wide load, and the BG process scheduling module 255 uses the predicted load to determine scheduling of background processes based on whether predicted load exceeds a designated threshold load.

Using more parameters increases the accuracy of the linear inference function. However, repeatedly collecting and analyzing metrics uses system resources. As a result, in some embodiments, to limit the load associated with metrics collection, a sliding window of a designated time (e.g., an X second sliding window) will be used to aggregate the parameters, where X is an integer greater than 0, and is configurable. In another alternative to limit the load associated with metrics collection, the metrics for each storage node are collected at designated intervals corresponding to a number of IO operations (e.g., every Y IO operations), where Y is an integer greater than 0 (e.g., Y=1000), and is configurable. With this approach, devices without IO operations will not add load.

Figure 7:
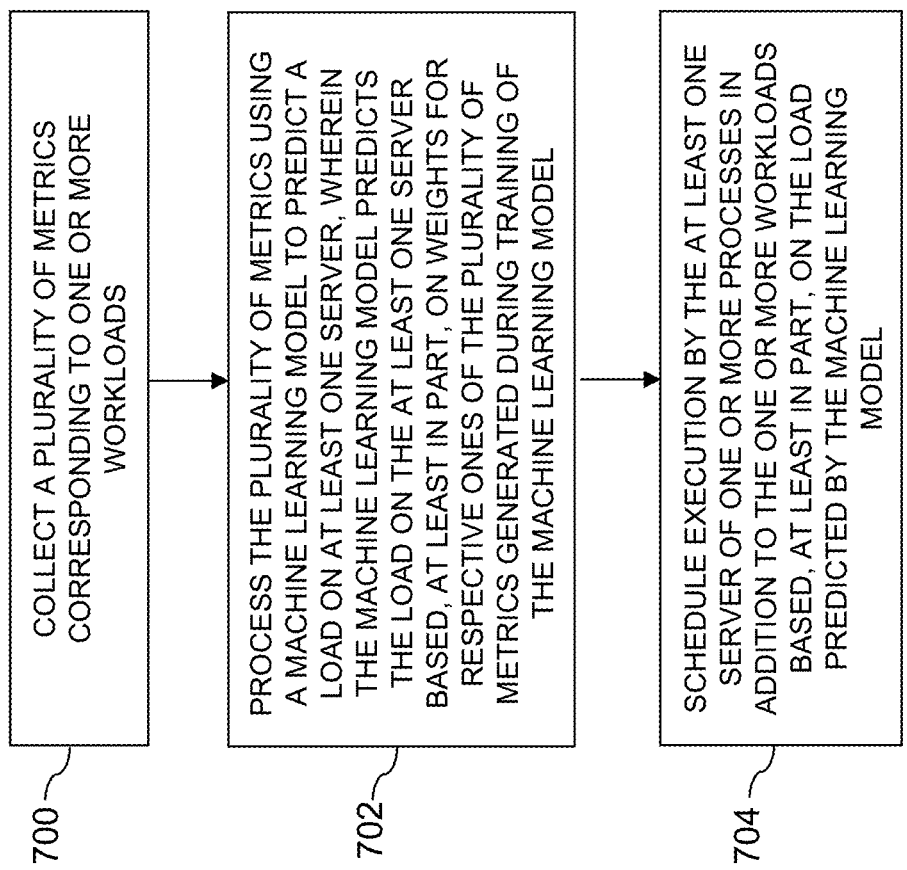
FIG. 7 illustrates a flow diagram of a method for intelligent load scheduling in an illustrative embodiment.

An exemplary method for implementing intelligent load scheduling will now be discussed in conjunction with the flow diagram of FIG. 7. In some embodiments, the process flow shown in FIG. 7 illustrates exemplary modes of operation of the intelligent load scheduling system 250 of FIG. 2. Referring to FIG. 7, at block 700, the intelligent load scheduling system 250 collects a plurality of metrics corresponding to one or more workloads. The one or more workloads correspond to one or more IO operations from one or more host devices. The collecting may be performed at designated intervals corresponding to a number of the IO operations.

At block 702, the intelligent load scheduling system 250 processes the plurality of metrics using a machine learning model to predict a load on at least one server (e.g., storage node). The machine learning model (e.g., PCA model) predicts the load on the at least one server based, at least in part, on weights for respective ones of the plurality of metrics generated during training of the machine learning model. The training of the machine learning model comprises collecting a plurality of training metrics, identifying a load on the at least one server corresponding to the plurality of training metrics, and processing the plurality of training metrics and the identified load by the machine learning model to generate the weights. The processing comprises running the plurality of training metrics and the identified load through a multiple linear regression. The training of the machine learning model reduces one or more dimensions of the plurality of training metrics, and/or eliminates one or more dependencies corresponding to the plurality of training metrics.

At block 704, the intelligent load scheduling system 250 schedules execution by the at least one server of one or more processes in addition to the one or more workloads based, at least in part, on the load predicted by the machine learning model. The one or more processes correspond to one or more background processes such as, but not necessarily limited to, data checksum validation and defragmentation. The scheduling of the execution by the at least one server of the one or more processes in addition to the one or more workloads comprises deferring the one or more processes.

It is to be appreciated that the FIG. 7 process and other features and functionality described above can be adapted for use with other types of systems configured to perform load scheduling in storage systems.

The particular processing operations and other system functionality described in conjunction with the flow diagram of FIG. 7 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium" or "processor-readable storage media".

Illustrative embodiments provide technical solutions that use machine learning techniques (e.g., PCA) to generate an adaptive function for inferring real-time loads, and use the predicted loads when determining whether to execute background processes. Unlike conventional approaches, the embodiments provide techniques which reduce dimensions and remove dependencies of input metrics to allow for rapid (e.g., real-time) determinations of device and system loads without unnecessary use of compute resources.

The embodiments address concerns of potential bias and excessive use of compute resources by generating an adaptive linear function that gives each metric its own weight for load determination, and by automatically applying predicted loads to an algorithm for determining when background processes should execute. As a result, the embodiments provide a methodology for automated adaptive throttling of background processes that is independent of the system topology and resource variety.

It is to be appreciated that the particular advantages described above and elsewhere herein are associated with particular illustrative embodiments and need not be present in other embodiments. Also, the particular types of information processing systems and/or features and functionality as illustrated in the drawings and described above are exemplary only, and numerous other arrangements may be used in other embodiments.

Figure 8:
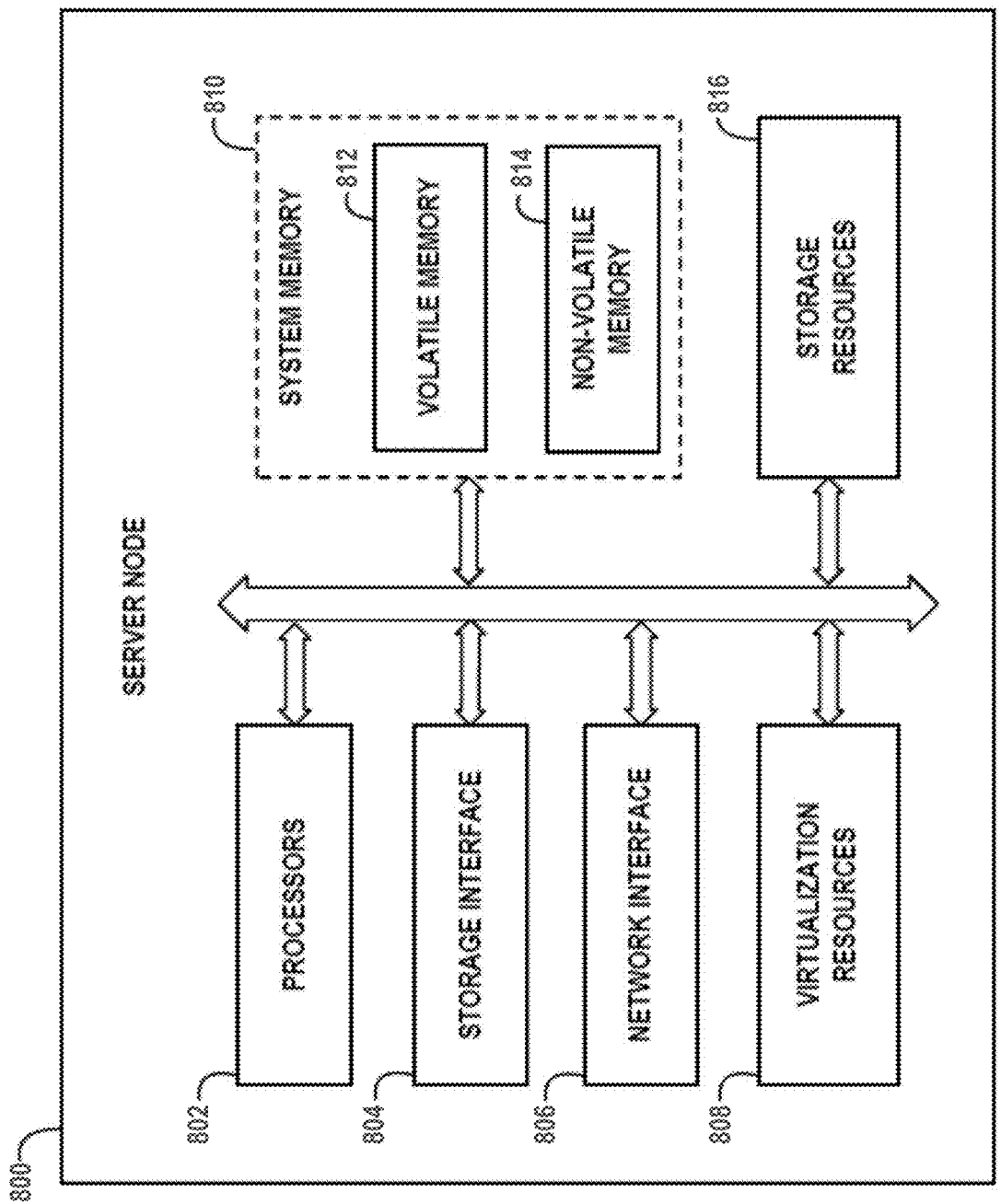
FIG. 8 schematically illustrates a framework of a server for hosting a storage control system which implements an intelligent load scheduling system in an illustrative embodiment.

FIG. 8 schematically illustrates a framework of a server for hosting a storage control system which implements an intelligent load scheduling system, according to an exemplary embodiment of the disclosure. The server node 800 comprises processors 802, storage interface circuitry 804, network interface circuitry 806, virtualization resources 808, system memory 810, and storage resources 816. The system memory 810 comprises volatile memory 812 and non-volatile memory 814. The processors 802 comprise one or more types of hardware processors that are configured to process program instructions and data to execute a native operating system (OS) and applications that run on the server node 800.

For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 808 can be instantiated to execute one or more services or functions which are hosted by the server node 800. For example, the virtualization resources 808 can be configured to implement the various modules and functionalities of a host connectivity management system as discussed herein. In some embodiments, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well execute one or more of the various modules and functionalities of a storage control node and intelligent load scheduling system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage control systems and intelligent load scheduling systems are implemented using program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile memory 812 is configured as the highest-level memory tier, and the non-volatile memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with 10 reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
collecting a plurality of metrics corresponding to one or more workloads at designated intervals corresponding to a number of the one or more workloads;
processing the plurality of metrics using a machine learning model to predict a load on at least one server, wherein the machine learning model predicts the load on the at least one server based, at least in part, on weights for respective ones of the plurality of metrics generated during training of the machine learning model, wherein the training of the machine learning model comprises:
collecting a plurality of training metrics;
identifying the load on the at least one server corresponding to the plurality of training metrics; and
processing the plurality of training metrics and the identified load by the machine learning model to generate the weights; and
scheduling execution by the at least one server of one or more processes in addition to the one or more workloads based, at least in part, on the load predicted by the machine learning model;
wherein the method is performed by at least one processing device comprising a processor coupled to a memory.

2. The method of claim 1, wherein the one or more workloads correspond to one or more input-output (IO) operations from one or more host devices.

3. The method of claim 2, wherein the one or more processes correspond to one or more background processes.

4. The method of claim 3, wherein the one or more background processes comprise at least one of data checksum validation and defragmentation.

5. The method of claim 1, wherein the processing comprises running the plurality of training metrics and the identified load through a multiple linear regression.

6. The method of claim 1, wherein the training of the machine learning model reduces one or more dimensions of the plurality of training metrics.

7. The method of claim 1, wherein the training of the machine learning model eliminates one or more dependencies corresponding to the plurality of training metrics.

8. The method of claim 1, wherein the machine learning model comprises a Principal Component Analysis (PCA) model.

9. The method of claim 1, wherein the plurality of metrics comprise at least one of a write size rate, a read size rate and a latency rate of the at least one server.

10. The method of claim 1, wherein the scheduling of the execution by the at least one server of the one or more processes in addition to the one or more workloads comprises deferring the one or more processes.

11. An article of manufacture comprising a non-transitory processor-readable storage medium having stored therein program code of one or more software programs, wherein the program code is executable by one or more processors to implement a method which comprises:
collecting a plurality of metrics corresponding to one or more workloads at designated intervals corresponding to a number of the one or more workloads;
processing the plurality of metrics using a machine learning model to predict a load on at least one server, wherein the machine learning model predicts the load on the at least one server based, at least in part, on weights for respective ones of the plurality of metrics generated during training of the machine learning model, wherein the training of the machine learning model comprises:
  collecting a plurality of training metrics;
  identifying the load on the at least one server corresponding to the plurality of training metrics; and
  processing the plurality of training metrics and the identified load by the machine learning model to generate the weights; and
scheduling execution by the at least one server of one or more processes in addition to the one or more workloads based, at least in part, on the load predicted by the machine learning model.

12. The article of manufacture of claim 11, wherein the training of the machine learning model reduces one or more dimensions of the plurality of training metrics.

13. The article of manufacture of claim 11, wherein the training of the machine learning model eliminates one or more dependencies corresponding to the plurality of training metrics.

14. The article of manufacture of claim 11, wherein the processing comprises running the plurality of training metrics and the identified load through a multiple linear regression.

15. The article of manufacture of claim 11, wherein the training of the machine learning model reduces one or more dimensions of the plurality of training metrics.

16. An apparatus, comprising:
  at least one processing device comprising a processor coupled to a memory;
  said at least one processing device being configured to:
    collect a plurality of metrics corresponding to one or more workloads at designated intervals corresponding to a number of the one or more workloads;
    process the plurality of metrics using a machine learning model to predict a load on at least one server, wherein the machine learning model predicts the load on the at least one server based, at least in part, on weights for respective ones of the plurality of metrics generated during training of the machine learning model, wherein the training of the machine learning model comprises:
      collecting a plurality of training metrics;
      identifying the load on the at least one server corresponding to the plurality of training metrics; and
      processing the plurality of training metrics and the identified load by the machine learning model to generate the weights; and
    schedule execution by the at least one server of one or more processes in addition to the one or more workloads based, at least in part, on the load predicted by the machine learning model.

17. The apparatus of claim 9, wherein the training of the machine learning model reduces one or more dimensions of the plurality of training metrics.

18. The apparatus of claim 9, wherein the training of the machine learning model eliminates one or more dependencies corresponding to the plurality of training metrics.

19. The apparatus of claim 16, wherein the processing comprises running the plurality of training metrics and the identified load through a multiple linear regression.

20. The apparatus of claim 16, wherein the training of the machine learning model reduces one or more dimensions of the plurality of training metrics.

* * * * *